United States Patent [19]

Squarer et al.

[11] Patent Number: 4,859,405
[45] Date of Patent: Aug. 22, 1989

[54] FILTERED VENTING AND DECAY HEAT REMOVING APPARATUS AND SYSTEM FOR CONTAINMENT STRUCTURES, AND METHOD OF OPERATION

[75] Inventors: David Squarer, Pittsburgh, Pa.; Andre Colin; Robert P. Prior, both of Brussels, Belgium; Frederick J. Mink, Rhoje-St-Genese, Belgium; Nicholas J. Liparulo, North Huntingdon, Pa.

[73] Assignee: Westinghouse Electric Corp., Pittsburgh, Pa.

[21] Appl. No.: 118,950

[22] Filed: Nov. 10, 1987

[51] Int. Cl.⁴ .................. G21C 15/18; G21C 9/00
[52] U.S. Cl. .................................. 376/299; 376/309; 376/314; 55/86; 55/95; 55/256
[58] Field of Search ............. 376/299, 309, 314, 313, 376/283; 261/122; 55/86, 95, 242, 252, 255, 256, 234, 243, 244, 249, 250, 253, 259, 90, 96

[56] References Cited

U.S. PATENT DOCUMENTS

| | | | |
|---|---|---|---|
| 1,838,511 | 12/1931 | Wilson | 55/249 |
| 2,171,752 | 9/1939 | Kamrath | 55/249 |
| 2,405,494 | 8/1946 | Dupuy | 55/252 |
| 2,409,558 | 10/1946 | Gunn | 55/95 |
| 3,282,033 | 11/1966 | Seppanen | 55/259 |
| 3,440,018 | 4/1969 | Eckert | 55/259 |
| 3,459,635 | 8/1969 | Bevilacqua et al. | 376/313 |
| 3,482,377 | 12/1969 | Walrave | 376/314 |
| 3,537,239 | 11/1970 | Dunmire | 55/250 |
| 3,626,672 | 12/1971 | Burbidge | 55/252 |
| 3,648,439 | 3/1972 | Szczepanski | 55/223 |
| 3,700,550 | 10/1972 | Shiells | 376/313 |
| 3,735,567 | 5/1973 | Viers | 55/233 |
| 3,756,580 | 9/1973 | Dunn | 55/255 |
| 3,793,809 | 2/1974 | Tomany et al. | 55/223 |
| 3,871,842 | 3/1975 | Queiser et al. | 376/314 |
| 3,890,100 | 6/1975 | Busch | 376/256 |
| 4,210,614 | 7/1980 | Kleimola | 376/299 |
| 4,432,777 | 2/1984 | Postma | 55/86 |
| 4,661,312 | 4/1987 | Schweiger | 376/283 |
| 4,762,539 | 8/1988 | Muto | 55/234 |

Primary Examiner—Brooks H. Hunt
Assistant Examiner—Daniel Wasil

[57] ABSTRACT

Gases and entrained particulate matter are automatically vented from a nuclear containment as pressure approaches a set point of the containment design during a postulated accident scenario. A porous bed filter is submerged in a tank of water, affording a first stage of filtration of the vented gases and entrained particulate matter passing in an upward flow from the bottom of the tank through the porous filter bed and a second, pool scrubbing stage as the flow proceeds upwardly through a central region of the water above the filter with accompanying decay heat removal prior to release of the gases from the water surface and discharge to atmosphere. The water returns through a down-flow path defined by an annular boundary region surrounding the central region of the water volume, in a pumping function for repeating the mixing and two-stage flow, and purges the porous filter bed. By proper sizing, required decontamination factors and temperature reduction are provided as a time integral function over a required passive operating interval for the postulated accident scenario.

23 Claims, 4 Drawing Sheets

PRIOR ART

FILTERED VENTING AND DECAY HEAT REMOVING APPARATUS AND SYSTEM FOR CONTAINMENT STRUCTURES, AND METHOD OF OPERATION

BACKGROUND OF THE INVENTION

1. Field of the Invention

This invention relates to a filtered venting and decay heat removing apparatus and system for a nuclear reactor containment and the method of operation thereof and, more particularly, to such apparatus, system and method for both filtering and cooling and also removing decay heat of the mixture of gases, particulates and aerosols vented from a nuclear reactor containment during severe accident sequences, to avoid late containment over-pressure failure and subsequent uncontrolled fission product release.

2. State of the Prior Art

The containment of a nuclear reactor is designed to withstand a predetermined pressure level, termed the pressure level set point, below which it will contain and thus prevent uncontrolled fission product release to the atmosphere in the event of a postulated major accident. Extensive analyses of the postulated accident scenarios applicable to a given reactor installation are performed for determining, or projecting the elapsed time interval sequences over which major events occur. In the case of a LOCA (loss of coolant accident), projections are made as to a first time interval over which the decreasing level of coolant within the reactor vessel causes the top of the core, i.e., the fuel element assemblies, to become exposed, a second time interval over which the fuel element assemblies start to melt, and a third time interval during which pressurizing increases to the pressure level set point of the design basis for the containment—beyond which containment failure due to over-pressure will occur, accompanied by the uncontrolled release of fission products to the atmosphere.

Accordingly, to protect against such late containment over-pressure failures, it has been proposed to provide reactor installations with appropriate systems and apparatus to achieve controlled and filtered venting of the containment in the event of a postulated major accident. The vent flow from the containment is a mixture of gases, particulates and aerosols, typically at high pressure and temperature, and since containing fission products, presenting the further problem of decay heat. For convenience, this vented flow is referred to as the gases vented from the containment and will be understood to include the mixture as before-stated. Stringent standards are set with regard to the percentage, of the vented gases which may be released to the atmosphere, as a time-integral function. For example, some countries have established a minimum removal efficiency of 99.9% for a specific type of a medium-size reactor, and an even greater percentage efficiency typically is required for larger reactors. The time-integral function, as relates to the controlled venting, typically postulates a time interval of 24 hours during which the system must function passively and automatically in response to the accident, following which it is assumed that further remedial activities may be undertaken by emergency maintenance and repair crews. In addition to satisfying these removal efficiency standards, hydrogen gas frequently is produced, which may require separate handling in view of the threat of hydrogen combustion which it presents. Conventional, alternative approaches include properly confining it and disposing of it by controlled ignition and venting of the combustion products to the atmosphere, or if levels are not excessive, use of a sufficiently large chimney or stack to vent it to the atmosphere. More sophisticated techniques involve rendering it inert with nitrogen, which requires sealing of the vessel into which the vented gases flow to preserve the nitrogen level and subsequent controls for thereafter disposing of the nitrogen, such as by the ways just mentioned, with replenishment of the nitrogen for maintaining the inert environment and preventing combustion.

Various techniques and apparatus have been proposed for the purpose of scrubbing, or filtering, the gases vented from a containment facility. Two basic types of such apparatus include pool-type scrubbers and a sand or gravel filters, the respective characteristics and features of which are described in U.S. Pat. No. 4,432,777—Postma, assigned to the United States of America as represented by the United States Department of Energy and entitled "METHOD FOR REMOVING PARTICULATE MATTER FROM A GAS STREAM."

Figure 1:
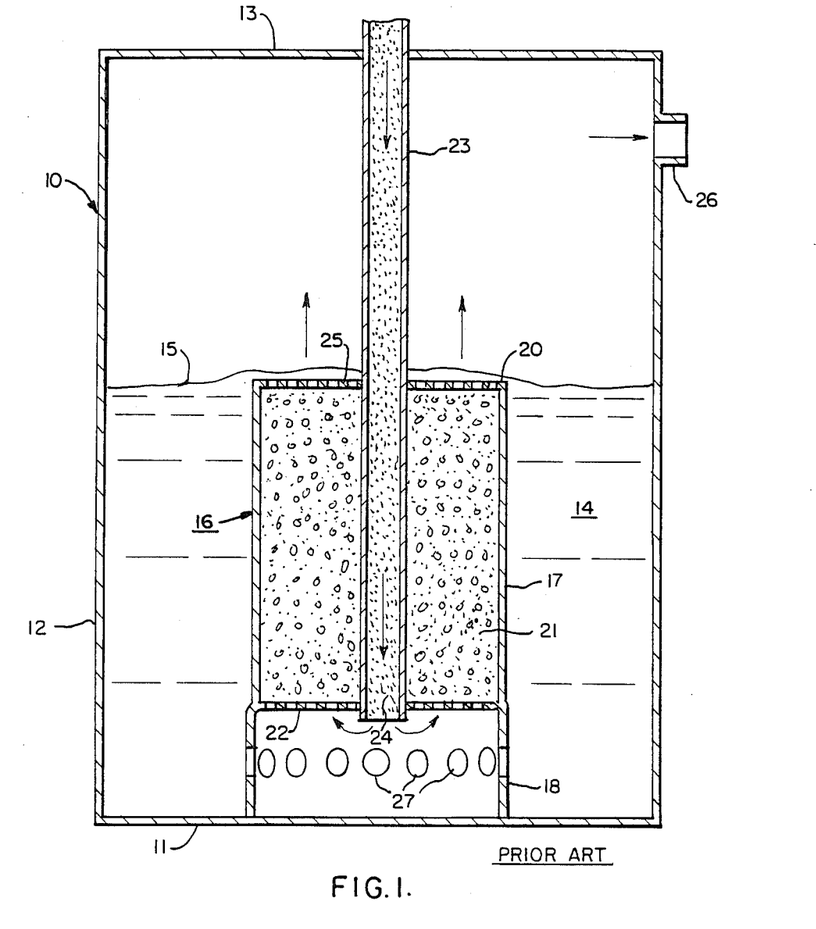
FIG. 1 is a schematic, cross-sectional and elevational view of the hybrid scrubber of, and is reproduced from FIG. 1 of, U.S. Pat. No. 4,432,777.

The Postma patent discloses a so-called "hybrid scrubber" comprising a porous bed which is at least partially submerged within a pool of liquid and is characterized as merging the desirable features of both a pool-type scrubber and a sand or gravel filter. FIG. 1 of that patent is reproduced as FIG. 1 herein, and substantial portions of the description of the hybrid scrubber in that patent are now set forth. As described beginning at column 2, line 62 of the patent specification, the Postma hybrid scrubber: "comprises a liquid-tight enclosure 10 having a bottom wall 11 and connecting upright side walls 12 defining an interior liquid tank. The tank is preferably fully enclosed and completed by a top wall 13, but can be upwardly open, as will be described below.

"A quantity of liquid 14 is contained within enclosure 10. This liquid might be water of any desired liquid that is physically stable and compatible with the structure and usage of the filter. It partially fills the interior liquid tank presented by enclosure 10 to a liquid surface elevation designated by reference numeral 15.

"An open ended container 16 is positioned within enclosure 10. It has gas impervious upright side walls 17 that extend from a lower end 18 to an upper end 20. The lower end of container 16 is submerged in the liquid 14. Its upper end 20 is either adjacent to, above or below the liquid surface elevation shown at 15.

"A porous bed 21 of gravel or other filtering material is surrounded by the gas impervious side walls 17 of container 16. Bed 21 extends vertically upward within container 16 from a bottom location spaced above the lower end 18 of the gas impervious upright side walls 17 of container 16. This location is defined by a transverse porous or perforated plate 22 extending across the side walls 17. In the preferred embodiment as shown, approximately half of the vertical height of the porous bed 21 is located beneath the elevation of the liquid surface at 15 and is therefore submerged in the liquid 14.

"An inlet duct 23 is provided for directing a stream of pressurized gas and particulate material or aerosol to a submerged location vertically beneath the porous bed 21. This is illustrated as a vertical tube made of gas impervious material and extending through the center of the porous bed 21. The inlet duct 23 terminates at an open bottom end 24 positioned at an elevation between the bottom of porous bed 21 and the lower end 18 of the gas impervious container walls 17.

"The top end of the porous bed 21 is illustrated as being covered by a transverse porous or perforated plate 25. While such a plate is desirable, it is not always necessary to keep bed 21 confined. The top end of bed 21 is transversely open to liquid flow to thereby permit liquid entrained with the stream of gas to be returned by gravity over the sides of container 16 to the liquid 14 within the interior liquid tank provided by enclosure 10.

"Various materials might be used within porous bed 21. The porous material should be insoluble in the liquid. It might constitute natural or artificial sand or gravel, fibrous materials, or other packing materials commonly used in either dry or wet filters.

"An outlet duct 26 is open through enclosure 10 at an elevation above the liquid surface at 15. Duct 26 discharges the stream of gas following its passage through the porous bed 21.

"The presence of the gas within the container 16 that surrounds the porous bed 21 reduces the apparent density of the liquid 14 within the bed confines. Consequently, as the gaseous stream rises through bed 21, liquid flows from within enclosure 10 into the bottom of the bed, moves upwardly, and subsequently spills over the top. Collected aerosol within porous bed 21 is thereby continuously washed from it. This passive, self-cleaning function of the porous bed 21 is one of the novel features of this device.

"The illustrated apparatus effectively moves aerosols from a gaseous stream. The efficiency of aerosol removal can be adjusted by modifying the depth of the porous bed 21, the size of the packing materials comprising bed 21 and the velocity of the gaseous stream directed through the inlet duct 23 and bed 21. The only limitation as to the amount of collected material which can be accommodated by the apparatus is the volume of the pool of liquid 14 and the solubility of the removed aerosol materials within the liquid. Another limit is the volume of insoluble particles that can be accommodated within the enclosure 10.

"The scrubber is a three phase liquid scrubber. The solid phase, comprising the porous material within the bed 21, is fixed in place. The gas and liquid phases flow concurrently through bed 21. Because of the complexity of such a system, tests were conducted to both develop the concept and measure scrubber performance.

"A prototype scrubber was constructed substantially as shown in FIG. 1. The bed was 0.30 m in diameter, 0.61 m deep, and was packed with basalt rock sieved to between +0.91 cm and −1.27 cm. The cross-sectional area available for gas flow was 0.069 m². The bed void fraction was 0.450+/−0.050.

"The granular basalt rock used in these tests is characterized as having no smooth sides. It was screened by hand into three segments. It was retained between horizontal plates 22 and 25 across the container side walls 17. Plates 22 and 25 as tested were made from solid flat sheets with apertures formed through them in a staggered pattern and a central aperture to receive the inlet duct 23. A second type of support plate usable in this apparatus could be fabricated from suitable screen material.

"It is to be noted that the lower end 18 of the container side walls 17 is provided with openings 27. They are spaced above the bottom wall 11 of enclosure 10 to prevent reentrainment of insoluble solids within the liquid and gas stream moving into porous bed 21. The openings 27 permit flow of liquid 14 beneath the porous bed 21. The areas between the openings 27 and the bottom of bed 21 constitutes a surrounding skirt within which incoming gas briefly accumulates before it moves upwardly through the porous bed 21.

"As is evident from FIG. 1, the horizontal cross-sectional area of container 16 is substantially less than the interior horizontal cross-sectional area within the enclosure 10. The cross-sectional area of container 16 is a function of the volume of gas which must be passed upwardly through bed 21. The cross-sectional area and depth of liquid 14 within enclosure 10 is a function of the storage capability required for handling aerosol removed from the stream of gas.

"The upright side walls 12 of enclosure 10 are spaced transversely outward from the side walls 17 of the container 16. This permits flow of liquid into the container 16 from all sides through the openings 27 and permits the liquid exiting from container 16 to spill about its entire periphery.

"The specific example of the scrubber utilized cylindrical side walls about the container 16, arranged vertically and centered about a vertical inner axis along the center of the illustrated inlet duct 23. The duct 23 was constructed as a straight vertical tube coaxially centered within the bed 21 along the vertical container axis."

The Postma U.S. Pat. No. 4,432,777 proceeds at column 4, line 56 et seq. to discuss a number of tests which were conducted using various sodium-compound aerosols to measure aerosol removal efficiency and using water as the wash liquid within the enclosure 10. Further, the flow rate of the gaseous stream was varied during each test and aerosol samples were periodically taken from both the inlet duct 23 and the outlet duct 24. Average and overall efficiencies of removal then were calculated; the reported data results indicated that the granular sizes within the bed 21 had no effect on the collection efficiency but that reducing the bed height by a factor of 2 increased aerosol penetration by a factor of 7. Overall and average efficiency calculations ranging from 96.78% up to 99.97% for the structure of FIG. 1 are reported.

Figure 2:
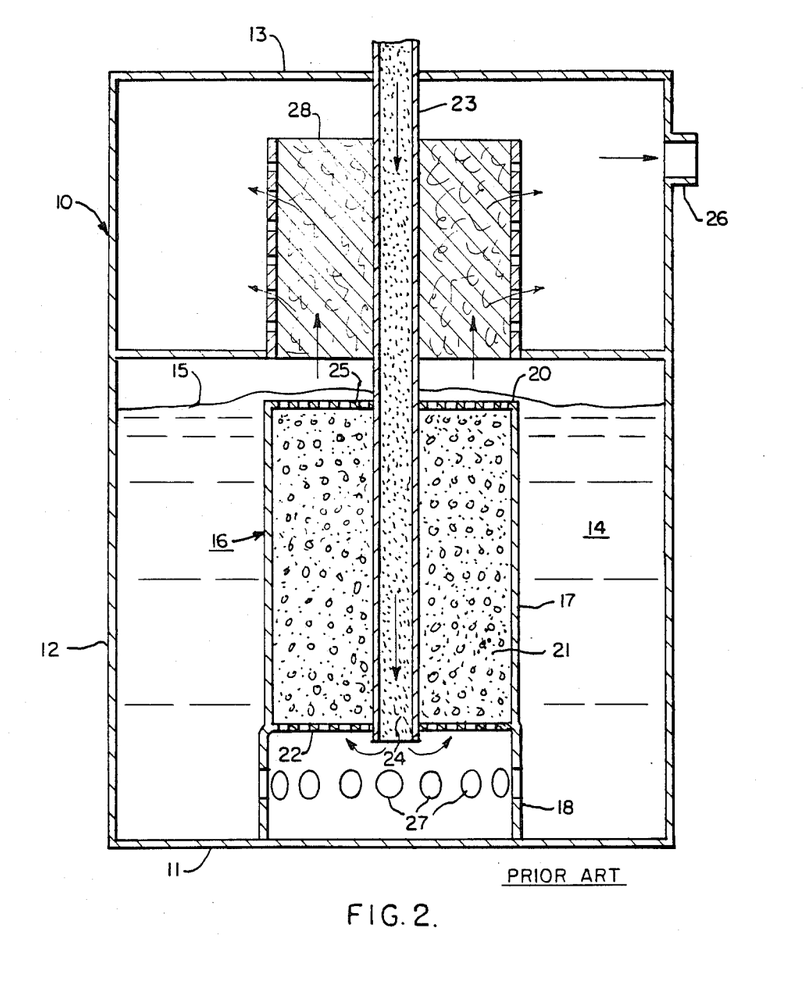
FIG. 2 is a modified embodiment of the hybrid scrubber of FIG. 1 and is reproduced from FIG. 2 of U.S. Pat. No. 4,432,777.

FIG. 2 of the Postma U.S. Pat. No. 4,432,777, also reproduced as FIG. 2 herein, discloses a modification of the Postma structure of FIG. 1, reported to have achieved increased removal efficiency by combining the hybrid scrubber of FIG. 1 with an available fibrous filter shown at 28 in FIG. 2, remaining elements of the structure of FIG. 2 being identical to and being identified by identical reference numerals as those in FIG. 1. The fibrous filter unit is reported to have measured 0.61 m OD by 0.56 m ID by 0.61 m long. The gas leaving the bed 21 is described as having flowed upwardly into the central region of the fiber unit 28 and then horizontally through the fibrous materials before proceeding radially outwardly, as indicated by the horizontal arrows, to be exhausted through the outlet 26.

The Postma U.S. Pat. No. 4,432,777 further notes, beginning at column 25, line 54: "Hydraulic tests were performed without aerosols for various bed configurations to measure pressure drop, water circulation rate, and water level effects. Pressure drop through the porous bed 21 was found to be independent of gas flow rate at rates between gas superficial velocities of 0.002 to 0.504 m/s. The pressure drop through the apparatus was found to be primarily due to the static liquid head at the submerged open bottom end 24 of inlet duct 23. The internal water circulation rate was found to be a function of the gas flow rate, bed depth, granular size and inlet duct submergence. In checking water flow rate versus gas flow rate for various bed parameters using a granular rock bed, water was found to be pumped at a decreasing rate as the water level dropped until the level was down to about one half the bed depth. The test parameter having the greatest effect on water flow rate was the depth of submergence of the inlet duct 23.

"The present apparatus is capable of handling a gaseous stream at pressures of 10–50 psi, which are typically containment pressures for vessels utilized in nuclear reactor installations. Gaseous streams vented from such containment vessels may be throttled as necessary in order to meet flow rate limitations of a particular scrubber apparatus. No other pumping of the gaseous stream is required, thereby eliminating any energy requirements for activation of the scrubber.

"The tests conducted on the experimental model indicate that a passive self-cleaning aerosol scrubber can be designed based on a superficial gas velocity of 0.507 m/s and a bed depth of 0.608 m. The aerosol removal efficiency can be predicted to exceed 99% for the aerosols that might be expected in a nuclear installation. Aerosol removal efficiency would exceed 99.9% for all feasible particle distributions if a passive fibrous filter is included as indicated in FIG. 2.

"In this apparatus, an airlift is used to circulate wash liquid through the packing within porous bed 21. The packing is kept clean during use of the scrubber without requiring utilization of external liquid pumps, which would in turn require a source of energy. This is extremely important under those conditions where electric power is not available.

"Removal efficiency of the scrubber can be designed to have the value required for any particular application. A high removal efficiency for small particles can be realized. This is a distinct advantage over submerged tubes, where large bubbles lead to low removal efficiencies for finer particles.

"Because the porous bed 21 is continually wetted, trapped dust will be either dissolved or washed from the bed material. Therefore, large masses of airborne particles can be trapped without plugging the porous bed 21.

"As compared to a simple submerged tube, this apparatus has a much lower pressure drop in a device designed to yield the same removal efficiency. This results from the breaking of the gas stream into small parcels as it enters the porous bed 21.

"All of the flow paths through the porous bed 21, which are small in size, are washed by the liquid and therefore will not plug. The inlet duct, which is not washed, can be as large as desired to assure that plugging will be prevented. This is a great improvement over other bubble breakup devices, such as the use of small diameter submerged tubes."

While the device of the Postma patent thus is characterized as having very high removal efficiencies for aerosols, it acknowledges that a removal efficiency exceeding 99.9% for all feasible particle size distributions requires the use of the passive fibrous filter 28 of FIG. 2. Furthermore, to the knowledge of the present inventors, those of skill in the art having direct familiarity and experience with the filter of the Postma U.S. Pat. No. 4,432,777 considered it important that the level of liquid within the enclosure 10 be not greater than substantially the elevation of the top end of the container 16, as illustrated in each of FIGS. 1 and 2: as the patent itself discloses, the pumping function decreased as the water level was lowered relatively to the top of the bed and should not be less than approximately one-half the bed depth.

While the Postma hybrid filter affords many advantages and offers a solution to certain of the filtration requirements for venting containment gases during a postulated major accident, it has many limitations rendering it incapable of fully satisfying those requirements, at least for many nuclear installations.

A significant factor is that the efficiency which can be achieved from any filter, whether a pool-type liquid scrubber or a porous, e.g., sand or gravel, filter—i.e., the constituents of the Postma hybrid filter—is a function of the constituents of the vented gas, including, e.g., the type and size of aerosols, and particulate matter which must be removed. For example, the test results of the Postma filter are based on removal of sodium aerosols, which typically are in the range of 3 to 5 microns in diameter; however, many nuclear facilities involve aerosols of smaller sizes, such as cesium and iodine which are in the micron and sub-micron diameter dimensions. Necessarily, the removal efficiencies of the Postma filter as reported in the Postma patent would be reduced, for such smaller sizes of aerosols.

Even more critical limitations of the Postma filter are that it not only is incapable of providing any meaningful amount of decay heat removal, but also is incapable of functioning for the requisite time interval of passive response to the accident—typically, 24 hours. Specifically, the vented gases intended to be filtered by the Postma filter may be as hot as 1,000° F.; that factor, plus the decay heat of the vented gases would produce rapid boiling and resulting vaporization of the water in the filter enclosure 10. As a result, the water would be inadequate, in volume, to achieve the necessary temperature reduction and decay heat removal, even proceeding from its initial condition, and would become increasingly deficient for these purposes as the water level decreases by boiling off. For the relative sizes of the enclosure 10 and the container 16 and for the specific examples thereof given in the Postma specification, the water level 15 would very rapidly descend below the half-height of the bed 21. Thus, not only would the filter have an inadequate volume of water even initially to effect decay heat removal, the pumping action essential to purging of the porous filter bed would diminish rapidly and eventually cease, as is alluded to in the Postma patent disclosure. Thus, the filtering function as well would be severely diminished.

Thus, in the postulated accident scenario, the Postma hybrid filter would fail adequately to provide the requisite filtered venting function, not only as to smaller particle size contaminants than the sodium aerosols, but also the requisite decay heat removal function, with or without the added fiberous filter, and its effective period of operation would be unacceptably short. It is significant in this regard that the intent is not only that the filter be operative after years of non-operating stand-by status, but also that no auxiliary power should be required to enable it to function. For the Postma filter to function for the requisite period of passive operation, e.g., 24 hours, would require that the vented gases be cooled preliminarily to minimize boiling of the water and its rapid evaporation—absent which, rapid lowering of the water level 15 and cessation of the pumping function, essential to the filtration function, would occur. Necessarily, cooling the escaping gases implies the use of some further equipment—which, if performing mechanical cooling, would necessarily imply the availability of auxiliary power. The need for auxiliary power, of course, is contrary to the required, wholly passive character of the apparatus to be relied upon for performing the filtered venting of gases from the containment structure in the event of a nuclear accident. Even if passive heat exchangers were employed to reduce the temperature of the vented gases, the Postma filter still would lack the ability to perform the requisite decay heat removal function.

SUMMARY OF THE INVENTION

The present inventors have surprisingly discovered that the combined functions of filtered venting of, and decay heat removal from, gases vented from a nuclear containment in the event of an accident may be achieved by a two-stage unit incorporating in the first stage a hybrid filter, structurally of the type of the Postma U.S. Pat. No. 4,432,777 and a second, upper stage pool scrubber within a common container, or enclosure, which stores a volume of water or other suitable liquid, at an elevation which is a multiple of the height of the porous filter of the first stage. For example, the inventors have determined that for at least certain specific applications, a height of water of from 3 to 5 meters above the surface of a gravel bed filter affords not only filtered venting of the requisite removal efficiency over the requisite period of passive response, but also the desired decay heat removal for the gases vented from a containment structure, as above specified. The enclosure, moreover, is of sufficient dimensions, or volume, so as to provide a head space to accommodate hydrogen gases which may be released and which may be handled separately by conventional techniques as above-described.

The apparatus of the present invention thus effectively functions as a two stage hybrid scrubber, the first stage comprising, structurally, the three-phase porous bed filter of the Postma patent and the second stage comprising a two-phase pool scrubber. As in the Postma patent, the first stage involves the solid phase of the porous bed through which the two phases of the vented gas mixture and liquid phases flow concurrently. The second stage is a two-phase liquid scrubber in which the vented gas mixture and liquid phases proceed upwardly through the pool of water above the porous bed. The vented gases thus are further scrubbed by the water as the flow travels upwardly through the additional height of water of the second stage. Moreover, as contrasted to pool-type scrubbers which characteristically produce relatively large gas bubbles and as contrasted to the porous bed filter of the Postma patent which are subject to plugging by aerosol deposition, the second stage of the apparatus of the present invention is inherently free of the plugging problem and, since the bubbles in the liquid/gas mixture are created by the gas passing initially through the porous bed, they are sufficiently small so as to produce efficient scrubbing and removal of even submicron size particles.

Significantly, the inventors hereof have determined that with such a substantial elevation of water above the upper end of the porous bed filter and corresponding volume, and despite temperatures of the vented gas as high as 1,000° F., not only is the requisite filtration function performed but also the temperature reduction of the hot, vented gases as well as decay heat removal functions are performed over the requisite time interval of passive response of, e.g., 24 hours. Importantly, while vaporization of water from boiling does occur and reduce the level and correspondingly the volume, sufficient water remains so as to prevent the water level from dropping below the top of the gravel bed even as of the conclusion of the time interval of passive response.

Of substantial importance, at the initial water level and thus substantial height of water above the porous bed filter and corresponding, substantial volume of water, the two-stage apparatus of the invention utilizes the dispersion or distribution effect of the porous filter bed and the reduced bubble size which it produces that the flow through the water of the second stage pool scrubber to the surface affords the requisite removal efficiencies. The pumping function which is important to the operation of the porous bed filter is maintained, despite the significantly increased elevation (and thus volume) of the water relative to that taught by the Postma patent and contrary to the conditions heretofore believed necessary for the operation of a Postma-type filter.

As disclosed in the Postma patent, the pumping function is essential to proper operation of the filter. The porous bed in that instance must serve to increase residence time of particulate matter; the pumping function and attendant recirculation of liquid must be operative to permit dissolution of soluble particulates into the liquid and thereby to assure that the same do not escape from the surface. By contrast and in accordance with the present invention, the substantial elevation of water in the second stage, given the dispersion function of the porous bed, provides sufficient scrubbing to achieve the requisite removal, substantially independently of the porous bed filter. Nevertheless, it has been determined that the pumping function is maintained. While believed to exist even at the initial, substantial water elevation, clearly it becomes functional as the water level decreases over the accumulating operating time of the passive response interval. Thus, even if the pumping function is hindered initially, although it is believed not to be, it is increasingly effective as the second stage water level reduces. This is an important result, because the reducing water level implies an increasing concentration of particulates in the water and reduced scrubbing time; however, less removal in the second stage is required as the porous bed filter becomes more effective with the decreasing height of water in the second stage.

The phenomena attendant the pumping function achieved by the two-stage filter of the present invention are not fully understood. However, it is believed that the gas and liquid phases proceeding upwardly from the porous bed remain sufficiently confined to a central region of the volume of water in the upward axial direction above the porous bed, such that the average density of the gas/water mixture in the central region, not only within the porous bed but also above the porous bed, remains below that of the surrounding, boundary region of water. The effect of gravity on the higher density of the boundary region relative to the lower density of the central region, combined with the upward force of the gas and liquid flow in the central region produce a circulation path from the upward flow in the central region to a downward flow in the boundary region which supports the pumping action for the porous bed filter. While the pumping action is thus believed to exist even for the initial level of water in the second stage, to the extent it is at all reduced or less effective, it nevertheless becomes effective as that level decreases over accumulated operating time. In that regard, the porous bed filter of the first stage and the pool scrubber of the second stage have complementary functions and efficiencies and in any event, combine to achieve the requisite removal efficiencies.

The apparatus of the present invention thus provides the combined features of filtered venting of the requisite removal efficiencies, even for sub-micron particles, and decay heat removal, rendering it ideally suited for incorporation in a passive, filtered venting and decay heat removal system for gases vented from a nuclear containment in an accident scenario. It may be readily constructed from conventional components. It operates automatically and without the requirement of auxiliary power or cooling apparatus and affords an improved method of performing these essential and critical functions.

DETAILED DESCRIPTION OF THE PREFERRED EMBODIMENT

Figure 3:
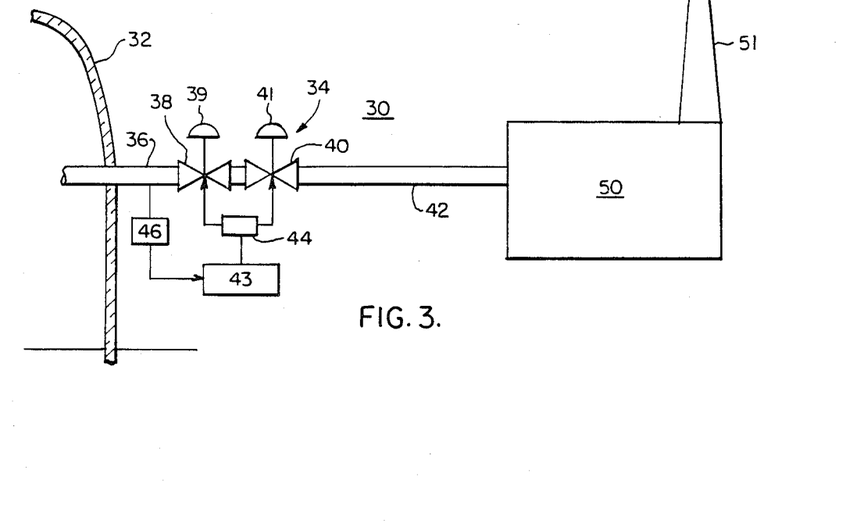
FIG. 3 is a schematic, elevational view, partly in cross-section, of a filtered venting and decay heat removing system in accordance with the invention for use with a nuclear reactor containment.

FIG. 3 is a schematic, elevational view, partly in cross-section, of the filtered venting and decay heat removing system 30 of the present invention. Containment 32, shown in schematic and fragmentary cross-section, may be of conventional type for housing a nuclear reactor. Venting sub-system 34 includes a vent pipe 36 which penetrates the containment 32, two pressure-actuated valves 38 and 40 connected in series, and pipe 42 which connects the second valve 40 to a filtering and decay heat removal sub-system 50. The venting sub-system 34 further comprises necessary supports (not shown) for the above-recited basic components. Typically, the vent pipe 36 which penetrates the containment structure 32 and the valves 38 and 40 are 8 inch internal diameter, the diameter of pipe 42 downstream of the valve 40 preferably being of an increased diameter.

Valves 38 and 40 are normally closed, for isolating the containment structure 32. Whereas one such valve would suffice, typically two valves as shown at 38 and 40 are employed for redundancy and thus improved safety. Each may be a gate-type valve of conventional type and include manual controls 39 and 41 to permit manual operation between the normally closed and opened positions.

In responding to an accident scenario, valves 38 and 40 are automatically actuated by valve controller 43 in response to detecting the upstream pressure, i.e., the pressure communicated through vent pipe 36 from the containment structure 32, increasing to a value predetermined in accordance with the pressure set point established in the design of the containment 32. Particularly, valve controller 43 comprises a dedicated, stored compressed air supply 44 and a pressure sensor 46. Pressure sensor 46 senses the pressure within the vent pipe 36 and thus within the containment structure 32 and is operational, upon detecting a pressure set point determined in accordance with the design of the containment structure 32, to activate the compressed air supply 44 which in turn drives the isolation valves 38 and 40 to the open position for venting the gases from within containment structure 32 and passing same through vent pipe 36 and pipe 42 to the filtered venting and decay heat removing sub-system 50. Sensor 46 furthermore responds to the pressure within containment structure 32 dropping below a predetermined level, such as approximately 75% of the set point pressure, to disable the compressed air supply 44 whereupon isolation valves 38 and 40 automatically return to the normal, closed positions.

The filtering and decay heat removing sub-system 50 processes the gases and particulate matter received from the containment structure 32 in accordance with predetermined decontamination factor (DF) requirements and decay heat removal requirements. Water vapor or steam at a safe temperature, as later explained, is released to the atmosphere through a dedicated stack 51. As before-noted, appropriate steps would be taken, as is conventional, to reduce the risks of hydrogen combustion in the sub-system 50 and its associated stack 51. In the alternative to the dedicated stack 51, any suitable stack associated with the nuclear plant may be employed; in that event, the dedicated stack 51 instead would be replaced with suitable pipe for connection to such an existing stack (not shown).

Figure 4:
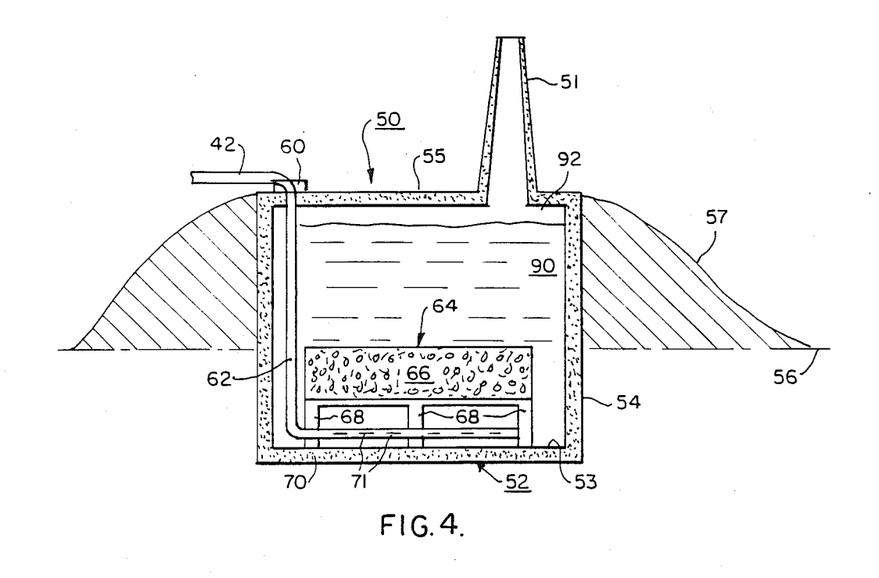
FIG. 4 is a schematic, cross-sectional and elevational view, on an enlarged scale and in fragmentary section, of the filtered venting and decay heat removing apparatus of FIG. 3.

The filtering and decay heat removing sub-system 50 of the invention is shown in greater detail in the schematic, elevational and cross-sectional view of FIG. 4. A cement tank 52, in accordance with conventional design and seismic considerations, is constructed such that approximately one-half of its height is subterranean, i.e., below the ground level 56, and the upwardly protruding portion thereof is surrounded by compacted backfill 57 for lateral support. The vertical sidewalls 54 of the tank 52 join integrally with the base 53 and may be enclosed by a top wall 55 to which stack 51 is connected. The tank 52 may be of any desired configuration, although typically is cylindrical; thus, the sidewalls 54 will be understood for this purpose and in the claims appended hereto to represent, as well, a continuous, cylindrical sidewall.

Pipe 42 is joined to a pipe coupler 60 which in turn connects to a down-flow pipe 62. The lower end of down-flow pipe 62 is connected to a porous bed filter 64 comprising a bed 66 of gravel or other suitable porous material bed and a gravel bed support 68 which rests on the base 53 of the tank 52. The filter 64 typically will be of a cross-sectional configuration corresponding to that of the tank 52; the correspondent need only be general and thus, for example, a filter 64 of horizontal, square configuration might be used within a tank 52 of generally circular cross-sectional configuration and thus of typical cylindrical configuration. Generally, the filter 64 is disposed centrally within the tank 52, but this is not deemed a limiting factor, as later explained.

A gas distributor 70 is mounted within the support 68 and is schematically illustrated to have openings 71 on its generally vertically upward surface. The gas distributor 70 is connected to the lower end of the down-flow pipe 62 so as to receive the vent gases passing therethrough and to release same through the openings 71 for passing in a uniformly distributed flow, generally vertically upwardly through the porous bed filter 64 and then vertically upwardly through the body of water 90 maintained within the tank 52. Significantly, and in complete contrast to the Postma filter of FIGS. 1 and 2, the porous bed filter 64 in accordance with the present invention is deeply submerged within the body of water 90, the latter extending to an elevation which is a multiple of the height, or elevation, of the gravel bed 66. Specific design parameters are set forth hereinafter with regard to that relationship.

Figure 5:
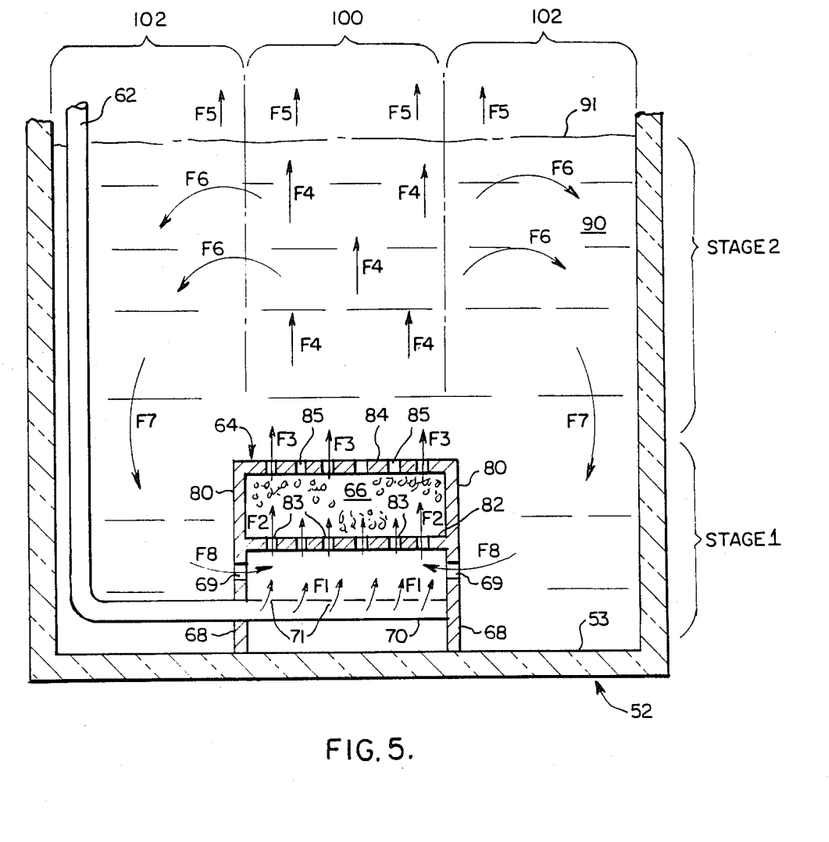
FIG. 5 is a fragmentary portion of the view of FIG. 4, on an enlarged scale, for illustrating details of the apparatus and explaining its operation.

The operation of the filtering and decay heat removal sub-system 50 in accordance with the present invention will be better understood from FIG. 5, a fragmentary and enlarged view of the structure of FIG. 4, and which illustrates, in greater detail, a fragmentary section of the tank 52 and further details of the porous bed filter 64, and the support 68 of FIG. 4. The head space 92 of FIG. 4 is not designated in FIG. 5 due to its fragmentary view. Significantly, sub-system 50 of the invention comprises two distinct stages, designated Stage 1 and Stage 2 in FIG. 5, which function, in successive and different manners and cooperatively, to achieve greatly improved removal efficiencies while additionally functioning to remove decay heat from the vented gases. As detailed hereinafter, Stage 1 performs the three-phase filtering function of the Postma filter and also functions in cooperation with Stage 2 to enable the latter to perform as a greatly enhanced efficiency pool-type scrubber. More specifically, the porous bed filter 64 functions to uniformly distribute the upward flow and to break the same up into very small bubbles to achieve the enhanced efficiency pool-type scrubbing action of Stage 2.

Significantly, the inventors hereof surprisingly discovered that, contrary o the teachings of the Postma patent, the fluid dynamics in the two-stage sub-system of the invention cooperate in a manner which maintains the pumping action as to the gravel bed 66 and thus the effective operation of Stage 1—despite the significant elevation of the body of water 90 above the top of the fully submerged porous bed filter 64 of Stage 1. While this unexpected result is not fully understood, an explanation of what is believed to be the dynamic operating principles of the two-stage sub-system 50 is set forth hereinafter. The important factor, however, is that a filtered venting and decay heat removing system 30 in accordance with the present invention, employing the two-stage filtering and decay heat removing sub-system 50, satisfies the critical need of a fully passive operating system which remains in a ready, stand-by position at all times, to achieve both the required removal efficiencies and absorption of decay heat from the gases vented from a nuclear containment under postulated accident conditions.

As shown in FIG. 5, the porous bed filter 64 includes imperforate, i.e., solid, vertical sidewalls 80, a lower support plate 82 having openings 83 therein and a top plate 84 having openings 85 therein, the foregoing structure surrounding and containing the gravel bed 66. The support 68 comprises a continuous wall extending from the perimeter of the lower support plate 82 to the base 53 of the tank 52 and having an array of openings 69 extending therethrough. The structure of the porous bed filter 64 thus may be deemed conventional and to correspond substantially to the structure of the container 16, having imperforate sidewalls 17 with lower ends 18 having openings 27 therethrough, of the Postma U.S. Pat. No. 4,432,777 and reproduced as FIGS. 1 and 2 hereof. However, the central location of inlet duct 23 of container 16 has been determined not to be a design requirement and instead, in accordance with the present invention, the down-flow pipe 62 is off-set from the filter 6 and connects laterally to the distributor 70. This eliminates the disruption and lost cross-sectional filtering area created by passing the central inlet duct 23 axially through the container 16 of FIGS. 1 and 2.

It is important that the distributor 70 of FIGS. 4 and 5 be configured and disposed in a manner compatible with the horizontal cross-sectional configuration of the filter 64, to assure that an even, or uniform, distribution of the inlet gas through the gravel bed 66 is achieved. Particularly, in FIG. 5, the inlet gas flows through the openings 71 of the distributor 70 as shown by arrows F1 so as to mix with the water 90 in the region beneath the lower support plate 82 and to flow as the two, mixed, water-gas phases, as shown by arrows F2, through the openings 83 into the gravel bed 66. The mixed, water-gas phases thus flow through the solid phase of the gravel bed 66 and together function, in general, as a three-phase filter/scrubber, as the Postma U.S. Pat. No. 4,432,777 characterizes its hybrid filter. Stage 1 of the sub-system 50 of the present invention therefor achieves the filtering function of the Postma hybrid filter as shown in FIG. 1 of the Postma U.S. Pat. No. 4,432,777 and herein, and as described hereinabove; accordingly, the description of the filtering operation with reference to FIG. 1 hereof is generally applicable to Stage 1 of the sub-system 50 of the present invention, and thus is not repeated. As before-noted, the filtering operation, while believed fully maintained, may be somewhat modified during an initial period of operation. A significant difference, however, arises as to the fluid flow dynamics and related filtering and decay heat removal functions in progressing from Stage 1 to Stage 2 of subsystem 50 of the invention, as contrasted to the operation of the hybrid scrubber of the Postma patent and FIG. 1 hereof.

More specifically, as to the Postma filter and with reference to FIG. 1, the (two-phase) water-gas mixture, upon emerging from the top end of bed 21, separates substantially immediately into an upward flow of gas as shown by the arrows therein and a transverse flow of water. The separated gas then is discharged through duct 26. In the alternative embodiment of FIG. 2, the gas instead passes in succession through the porous fiber filter 28 before discharging through outlet duct 26. The separated liquid, in both cases, flows transversely over the top plate 25 and returns by gravity, i.e., "spills", about the periphery of container 16 defined by the plate 25 and the side walls 17, to return to the body of water 14 as maintained within the enclosure 10. To the knowledge of the present inventors, those of skill in the art and knowledgeable as to the functioning of the filter of the Postma U.S. Pat. No. 4,432,777 considered that this return flow path was essential for maintaining the pumping action and thus the filtering function.

The present inventors, however, surprisingly discovered that greatly improved removal efficiencies may be achieved by the two-stage filtering and decay heat removing subsystem 50 and, particularly and as shown in FIG. 5, that the height of water in Stage 2 may be a multiple of the vertical height of the bed 66 of filter 64 in Stage 1, while maintaining the pumping action. As shown in FIG. 5, the mixed gas and water phases, with entrained particulate matter, pass generally vertically upwardly through the openings 85 in the top plate 84, as shown by arrows F3, and continue generally in that same upward vertical direction through Stage 2, as shown by arrows F4. The water in Stage 2 functions as a pool-type scrubber on the flow F4, but one which is far more effective and efficient than a conventional pool-type scrubber due to the reduced bubble sizes resulting from the filtering function of the gravel bed 66. Further, due to the height of Stage 2, the corresponding, substantial volume of the body of water 90 provides the critical function of decay heat removal, such that the flow of gas released above the surface 91 of the water 90, identified by arrows F5, is at a reduced temperature which is safe for discharge to the atmosphere, in addition to having been extensively scrubbed in stage 2 for removing even very fine particulate matter contaminants and other aerosols which escape from the porous bed filter 64 of Stage 1. In this regard, at least during an initial period of operation, filter 64 serves a primary distribution and dispersion function, the height of water 90 providing enhanced pool scrubbing and effectively being capable, independently of the filtering function of the filter 64, to achieve the necessary removal efficiencies.

As before noted, the inventors herein surprisingly discovered that despite the substantial elevation of water 90 above the porous filter bed 64, the pumping action essential to its operation nevertheless is maintained. This result is all the more surprising in that the Postma hybrid filter was predicated to function on the separation of gas from the two-phase mix of gas and water, substantially at the surface of the porous bed filter, with the gas proceeding upwardly for discharge and the water proceeding transversely to spill by gravity around the perimeter of the porous bed filter and rejoin the body of water within the container, as previously discussed. In total contrast, in the two-stage subsystem 50 of the invention, as shown in FIG. 5, the mixed water-gas phase exits from Stage 1 and proceeds as a continuing two-phase mix of water and gas through Stage 2 in a continuing, vertically upward direction as shown by the arrows F3 and F4, respectively. Thus, the separation of the two-phase mix of water and gas and the transverse flow of water with vertical release of gas at the surface of the Postma porous filter bed, heretofore believed necessary for functioning of the Postma filter, simply is not present.

While the phenomenon is not fully understood, it is believed that the fact that the pumping action as to porous bed filter 64 is maintained is attributable to the following. Initially, and with reference to FIG. 5, it appears that the body of water 90 effectively is delineated into a central region 100 corresponding generally, in horizontal cross-section, to the cross-sectional area and configuration of the porous bed filter 64. Porous bed 64 thus is positioned generally centrally within the tank 52 and defines thereby a boundary region 102 of the body of water 90 surrounding the central region 100. While not believed necessarily a limiting factor, it is believed preferable that the porous bed filter 64 have a horizontal cross-sectional configuration corresponding to the interior horizontal cross-sectional configuration of the tank 52 so as to maintain relative symmetry therebetween and of the boundary region 102 relative to the central region 100. While not limiting, it is believed preferable that tank 52 be of a generally cylindrical configuration; porous bed filter 64 should be generally symmetrical, either square (or other polygon) or round, and positioned to define the central region 100 and the generally annular boundary region 102. The filter 64, however, may be positioned eccentrically relative to tank 52 and thus not coaxially aligned; accordingly, the central region 100 need not be coaxially aligned. If required by design considerations, the filter 64 may be disposed closely adjacent a segment of the interior sidewall of tank 52; the recirculating flow paths, to be described, nevertheless will be produced. In that regard, the boundary region 102 need not be annular in a geometric sense.

It is believed that the flow of the mixed gas and water phases shown by arrows F4 remains sufficiently defined within the central region 100 such that the effective density within the central region 100 is less than that within the boundary region 102. Thus, the differential effect of gravity on the more dense water in the boundary region 102 combines with the positive upward force from the gas pressure producing the flow F4 in the central region 100 to produce a down-flow in the boundary region 102. Correspondingly, there results a transverse flow of water from the central region 100 to the boundary region 102 in the upper portion of Stage 2, as shown by arrows F6, with the down-flow in boundary region 102 being shown by arrows F7. The down-flow shown by arrows F7 then turns and proceeds laterally inwardly through the openings 69 in the support 68 to the central region 100 underlying the gravel bed 66, as shown by arrows F8, to mix with the incoming vent gas shown arrows F1, the flow continuously cycling in this manner. This result is highly surprising and unexpected, in view of the extreme turbulence which exists within the body of water 90 due to the very high pressure and high temperature, e.g., 1,000° F., and the decay heat of the inlet flow of gas and other materials received from the containment structure.

While, as before-noted, the recirculating flow illustrated by arrows F1 through F4 and F6–F8 may be relatively reduced and perhaps nonexistent in view of the elevation of water in Stage 2 at the initial time of operation. Nevertheless, the requisite removal efficiencies are achieved by the pool scrubbing function of Stage 2. As the water level in Stage 2 reduces over time, the recirculating flow increases, with concomitant increase in the removal capability of the porous bed filter 64, a factor consistent with the increasing concentrations of dissolved contaminants from the vented gases in the water. Thus, whether or not porous filter bed 64 has its fully functional removal capability at the outset of operation, it is clear that the recirculating flow and pumping function necessary to achieve that removal capability increase over the elapsed time of operation as the elevation of water in Stage 2 reduces. In this sense, Stages 1 and 2 are complementary in their respective removal capabilities, as a function of operating time, and their combined effects provide the requisite removal efficiencies.

As those of skill in the art will appreciate, the functional requirements for the two stage filtering and decay heat removing subsystem 50 of the present invention necessarily are application-specific, taking into account not only the size and type of nuclear installation but also the accident scenario or vent sequence peculiar to a given installation, along with the postulated decontamination factor and heat sink requirements. The vent flow, of course, must be sufficient so as to maintain the containment pressure at or below the set point. The maximum vent gas flow requirement, as before-noted, affects the vent pipe diameter (i.e., see vent pipe 36 in FIG. 3) and the subsequent connections (e.g., isolation valves 38 and 40 and pipes 42 and 62, FIGS. 3 through 5) as well as the size of the gravel bed 66. A typical value of the mass flow rate of the vented gases for a pressurized water reactor (PWR) is 5 m$^3$/s at the containment pressure set point design. Typical decontamination factors are 1,000 for particulates and 100 for elemental iodine.

The dimensions of the tank 52 furthermore are selected to assure an adequate height, or elevation, as well as volume of water 90 in Stage 2, such that the requisite decay heat removal function is achieved. Gas distributor 70, of course, must accommodate the predicted rate of flow and be configured to assure a homogeneous distribution of gas in the initial flow F1 therefrom to produce a homogeneous distribution of the flow F2 through the bed 66. As will be understood by those of skill in the art, the DF and heat sink (or decay heat removal) requirements are a time integral function related to the required period of passive operation, typically 24 hours.

While, in the abstract, it would appear desirable to increase the height of water in Stage 2 above the elevation of the porous bed filter of Stage 1 essentially without limit, there necessarily are many practical constraints, including seismic design requirements, which render such an approach impractical. Moreover, there may be a height limitation as to Stage 2, beyond which the pumping action will not be maintained due to dispersion of the flow F4 from the central region 100 into the boundary region 102 (FIG. 5), in which event adequate scrubbing action within the porous bed filter 64 may not occur. This circumstance, however, has not been encountered in any practical design. Moreover, Stages 1 and 2 are complementary in their operations and respective removal efficiencies, over accumulated operating time, and the combined effects thereof achieve the requisite removal efficiencies.

While the design of a filtering and decay heat removing sub-system 50 in accordance with the present invention thus may be optimized for any given nuclear plant or installation, certain basic parameters, taking into account seismic and practical design considerations, can be defined as generally applicable to any specific design. Particularly, the height of water in stage 2 must be sufficient to provide the requisite scrubbing action for removal of particulates which escape from the gravel bed 66 over the specified time integral function and, as to both height and volume, to afford an adequate heat sink. Recognizing that the water volume and thus height will decrease due to boil-off over the requisite passive operating interval, sufficient water should still remain so as to maintain a level covering the porous bed 66 to assure adequate filtration in Stage 1.

To assure adequate pumping action, it is necessary to maintain a sufficient cross-sectional area of the boundary region 102 to provide the down-flow and return circulation flow to the porous bed filter 64. This requirement may be related by the ratio of the total cross-sectional area of the body of water 90 (i.e., the total cross-sectional area of the regions 100 and 102 and thus of the interior of the tank 52) to the cross-sectional area of the porous bed filter 64 (essentially region 100 in FIG. 5) so as to maintain the pumping action. Although no maximum upper limit of the ratio value is known to exist, other than as dictated by practical considerations, the ratio cannot be reduced below a certain minimum at which the demarcation between the central region 100 and the boundary region 102 ceases to exist, at least for a portion of the vertical height of Stage 2. In this regard, it is expected fully that the demarcation between central region 100 and boundary region 102, as shown by dotted lines in FIG. 5, is not precisely maintained and indeed that central region 100 may expand outwardly and even encompass the boundary regions 102 progressing toward the top of the body of water 90 in Stage 2. One practical design employed a ratio of four, although a smaller ratio value clearly would remain operative.

To enable those of skill in the art to practice the present invention, parameters are now set forth for the design of filtered venting and decay heat removing sub-systems in accordance with the invention, for use with typical reactor installations in the 3,000 megawatt range, both pressurized water reactors and boiling water reactors. The height of the water in Stage 2 and thus above Stage 1 as a practical and presently deemed preferred value, is approximately 5 meters although as little as 3 meters Will suffice for certain reactors, with the total water volume in the range of from 600 to 1,200 cubic meters. Typical depths of the gravel bed 66 range from 0.6 meters to 1 meter, with cross-sectional areas ranging from 20 to 30 square meters. These factors equate to a height ratio of the water to that of the porous filter bed in a range of approximately 5 to 10 and a volume ratio in a range of approximately 20 to 1,000. As to both ratios, the lower ends of the respective ranges necessarily must be selected to afford an adequate heat sink as to volume and an adequate vertical height of water in Stage 2 to assure adequate scrubbing and thus filtration, as a time integral function over the postulated period of passive operation. For the reasons above-noted, there is no necessary upper limit of either of these ranges, other than as may be dictated by practical design considerations. Optimizing the sub-system design for a pressurized water reactor (PWR) tends to dictate use of a volume of water toward the higher end of the range, in view of the higher gas temperatures, but permits use of a gravel bed area and depth toward the lower end of the range; conversely, for a boiling water reactor (BWR) and due to its generally lower mass flow rate of the vent gas, a water volume toward the lower end of the range may be employed whereas the gravel bed area and depth should be selected toward the upper end of the range. With these basic design parameters, those skilled in the art, will be able to design appropriately sized and configured sub-systems of the invention for substantially all practical nuclear plant applications.

Numerous modifications and adaptations of the apparatus and the method and system of the present invention accordingly will be apparent to those of skill in the art and thus it is intended by the appended claims to cover all such modifications and adaptations which fall within the true spirit and scope of the invention.

What is claimed is:

1. Apparatus for filtering and removing heat and entrained particulate matter from pressurized gases, comprising:
   an impervious enclosure having a base and at least vertical sidewalls defining therewithin predetermined values of cross-sectional area, height and corresponding volume, and comprising a first lower stage extending from the base to a first height and a second stage extending from the first stage to a second height and a head space thereabove, the second stage being of greater height and volume than the first stage;

a filter having impervious vertical sidewalls and perforated top and bottom, horizontal closure plates secured to the sidewalls and defining therewithin predetermined values of horizontal cross-sectional area, sidewall height and corresponding volume, the porous bed filter being substantially filled with a porous filter media to define a porous filter bed and positioned centrally within the enclosure and displaced by a predetermined vertical space from the base thereof with the top plate at the first height and defining the first stage, a central region substantially equal to the cross-sectional area of the porous filter bed, the central region extending through the filter bed and upwardly into the second stage, and a boundary region surrounding and extending between the central region and the interior of the enclosure, the perforated top and bottom closure plates providing generally vertical flow paths through the porous filter bed;

a volume of water received in the enclosure and filling same to an initial water surface level substantially at the second height;

a distributor positioned within the predetermined vertical space and beneath the porous filter bed for receiving hot pressurized gases and entrained particular matter and distributing the same in a generally vertically upward direction and substantially uniform flow distribution toward the porous filter bed;

means for permitting water to flow from the boundary region portion of the volume thereof in the first stage, laterally inwardly to within the predetermined vertical space between the porous filter bed and the base of the enclosure for mixing with the gases and particulate matter distributed by the distributor and producing a mixed two-phase flow in the generally vertical flow paths through the porous filter bed for first stage filtering thereby and upwardly through the volume of water in the central region of the second stage above the porous filter bed for second stage filtering by pool scrubbing and for removing decay heat thereby; and means disposed above the initial water surface level in the second stage of the enclosure for discharging gases separated and released from the mixed, two-phase flow at the surface of the volume of water.

2. Apparatus as recited in claim 1, further comprising:
an impervious top enclosure plate; and
the discharging means comprises an exhaust port through the top enclosure plate for exhausting the released gases to the atmosphere.

3. Apparatus as recited in claim 1, wherein the ratio of the cross-sectional area of the enclosure to that of the porous filter bed is selected to be no less than a minimum value required for maintaining the boundary region.

4. Apparatus as recited in claim 1, wherein the ratio of the height of the second stage to that of the porous filter bed is a minimum of approximately five.

5. Apparatus as recited in claim 1, wherein the ratio of the cross-sectional area of the enclosure to that of the porous filter bed is selected to be no less than a minimum value required for maintaining the boundary region and the ratio of the height of the second stage to that of the porous filter bed is a minimum of approximately five.

6. Apparatus as recited in claim 1, wherein the ratio of the volume of the second stage to that of the porous filter bed is a minimum of approximately 20, and the ratio of the height of the second stage to that of the porous filter bed is a minimum of approximately five.

7. Apparatus for filtering and removing decay heat and entrained particulate matter from pressurized gases, upon being vented from a nuclear containment and prior to release to the atmosphere in a postulated accident scenario specifying the pressure, volumetric flow rate and temperature of the vented gases and the type of contaminants therein including entrained particulate matter, and in accordance with required decontamination factor and temperature reduction values as a time integral function over a predetermined passive operative interval, comprising:

an impervious enclosure having a base and at least vertical sidewalls defining therewithin predetermined values of cross-sectional area, height and corresponding volume, and comprising a first lower stage extending from the base to a first height and a second stage extending from the first stage to a second height and a head space thereabove, the second stage being of greater height and volume than the first stage;

a filter having impervious vertical sidewalls and perforated top and bottom, horizontal closure plates secured to the sidewalls and defining therewithin predetermined values of horizontal cross-sectional area, sidewall height and corresponding volume, the filter being substantially filled with a porous filter media to define a porous filter bed and positioned centrally within the enclosure and displaced by a predetermined vertical space from the base thereof with the top plate at the first height and defining the first stage, a central region substantially equal to the cross-sectional area of the porous filter bed, the central region extending through the filter bed and upwardly into the second stage, and a boundary region surrounding and extending between the central region and the interior of the enclosure, the perforated top and bottom closure plates providing generally vertical flow paths through the porous filter bed;

a volume of water received in the enclosure and filling same to an initial water surface level substantially at the second height;

a distributor positioned within the predetermined vertical space and beneath the porous filter bed for receiving hot pressurized gases and entrained particulate matter and distributing same in a generally vertically upward direction and substantially uniform flow distribution toward the porous filter bed;

means for permitting water to flow from the boundary region portion of the volume thereof in the first stage, laterally inwardly to within the predetermined vertical space between the porous filter bed and the base of the enclosure for mixing with the gases and particulate matter distributed by the distributor and producing a mixed two-phase flow in the generally vertical flow paths through the porous filter bed for first stage filtering thereby and upwardly through the volume of water in the central region of the second stage above the porous filter bed for second stage filtering by pool scrubbing and for removing decay heat thereby;

means disposed above the initial water surface level in the second stage of the enclosure for discharging gases separated and released from the mixed, two-phase flow at the surface of the volume of water; and the second height defining the top of the second stage being selected to accomodate a corresponding height of water to perform sufficient second stage pool scrubbing of the mixed, two-phase flow in combination with the first stage filtering thereof by the porous filter bed to achieve the required decontamination factor values and the volume of the second stage being selected to accomodate a corresponding sufficient volume of water for functioning as a heat sink for achieving the required temperature reduction of decay heat removal values, as time integral functions over the required passive operating interval.

8. Apparatus as recited in claim 7, wherein:
the volume of the second stage and the corresponding volume of water therein are selected to afford a remainder volume of water at the conclusion of the passive operating interval, sufficient to substantially fill the first stage and cover the porous filter bed.

9. A filtering venting and decay heat removing system for a nuclear installation for filtering and removing decay heat from pressurized gases and entrained particulate matter vented from a nuclear containment in a postulated accident scenario, comprising:

a first pipe penetrating the containment;
valve means normally closing the first pipe;
valve controller means for responding to pressure within the nuclear containment approaching a pressure set point in accordance with the design of the nuclear containment for automatically operating the valve means and thereby venting pressurized gases and entrained particulate matter from the nuclear containment to maintain the gas pressure at a value no greater than the pressure set point of the containment;
an impervious enclosure having a base and at least vertical sidewalls defining therewithin predetermined values of cross-sectional area, height and corresponding volume, and comprising a first lower stage extending from the base to a first height and a second stage extending from the first stage to a second height and a head space thereabove, the second stage being of greater height and volume than the first stage;
a filter having impervious vertical sidewalls and perforated top and bottom, horizontal closure plates secured to the sidewalls and defining therewithin predetermined values of horizontal cross-sectional area, sidewall height and corresponding volume, the filter being substantially filled with a porous filter media to define a porous filter bed and positioned centrally within the enclosure and displaced by a predetermined vertical space from the base thereof with the top plate at the first height and defining the first stage, a central region substantially equal to the cross-sectional area of the porous filter bed, the central region extending through the filter bed and upwardly into the second stage, and a boundary region surrounding and extending between the central region and the interior of the enclosure, the perforated top and bottom closure plates providing generally vertical flow paths through the porous filter bed;
a volume of water received in the enclosure and filling same to an initial water surface substantially at the second height;
a distributor positioned within the predetermined vertical space and beneath the porous filter bed for receiving hot pressurized gases and entrained particulate matter and distributing same in a generally vertically upward direction and substantially uniform flow distribution toward the porous filter bed;
a pipe connecting the valve means to the distributor for conveying the pressurized gases and entrained particulate matter vented from the containment and passed through the first pipe and the opened valve means to the distributor;
means for permitting water to flow from the boundary region portion of the volume thereof in the first stage, laterally inwardly to within the predetermined vertical space between the porous filter bed and the base of the enclosure for mixing with the gases and particulate matter distributed by the distributor and producing a mixed two-phase flow in the generally vertical flow paths through the porous filter bed for first stage filtering thereby and upwardly through the volume of water in the central region of the second stage above the porous filter bed for second stage filtering by pool scrubbing and for removing decay heat thereby; and
means disposed above the initial water surface level in the second stage of the enclosure for discharging gases separated and released from the mixed, two-phase flow at the surface of the volume.

10. A system as recited in claim 9, wherein the valve controller means responds to a subsequent reduction of pressure within the nuclear containment from the level approaching the pressure set point to a prescribed, lower level, for closing the valve means.

11. A method for filtering and removing heat and entrained particulate matter from the pressurized gases comprising:

providing an impervious enclosure having a base and at least vertical sidewalls defining therewithin predetermined values of cross-sectional area, height and corresponding volume, and comprising a first lower stage extending from the base to a first height and a second stage extending from the first stage to a second height and a head space thereabove, the second stage being of greater height and volume than the first stage;
disposing a filter within the enclosure, the filter having impervious vertical sidewalls and perforated top and bottom, horizontal closure plates secured to the sidewalls and defining therewithin predetermined values of horizontal cross-sectional area, sidewall height and corresponding volume, the filter being substantially filled with a porous filter media to define a porous filter bed and positioned centrally within the enclosure and displaced by a predetermined vertical space from the base thereof with the top plate at the first height and defining the first stage and the cross-sectional area of the porous filter bed defining a central region of substantially equal cross-sectional area in the first stage, the central region extending upwardly into the second stage, and a boundary region surrounding and extending between the central region and the interior of the enclosure, the perforated top and bottom closure plates providing generally vertical flow paths through the porous filter bed;

filling the enclosure with a volume of water to an initial water surface level substantially at the second height;

distributing hot pressurized gases and particulate matter within the predetermined vertical space and beneath the porous filter bed in a generally uniform flow distribution toward the porous filter bed;

permitting water to flow from the boundary region portion of the volume thereof in the first stage, laterally inwardly to within the predetermined vertical space between the porous filter bed and the base of the first enclosure for mixing with the gases and particulate matter therein distributed and producing a mixed two-phase flow in the generally vertical flow paths through the porous filter bed for first stage filtering thereby and upwardly through the volume of water in the central region of the second stage above the porous bed filter for second stage filtering by pool scrubbing and for removing decay heat thereby; and discharging gases separated and released from the mixed, two-phase flow at the surface of the volume of water.

12. A method as recited in claim 11, further comprising:
providing predetermined values of the enclosure for accommodating, and filling same with, a volume of water wherein the ratio of the initial height of water in the second stage to the height of the porous filter bed is a minimum of approximately five.

13. A method as recited in claim 11, further comprising:
providing predetermined values of the enclosure for accommodating, and filling same with, an initial volume of water wherein the ratio of the volume of water in the second stage to the volume of the porous filter bed is a minimum of approximately 20.

14. A method as recited in claim 11, further comprising:
providing predetermined values of the impervious enclosure for accommodating, and filling same with, a volume of water, wherein the ratio of the initial height of water in the second stage to the height of the porous filter bed is a minimum of approximately five and the ratio of the volume of the first stage to the volume of the filter bed is a minimum of approximately 20.

15. A method for filtering and removing decay heat and entrained particulate matter from pressurized gases, upon being vented from a nuclear containment and prior to release to the atmosphere in a postulated accident scenario specifying the pressure, volumetric flow rate and temperature of the vented gases and the type and amount of contaminants therein including entrained particulate matter, and in accordance with required decontamination factor and temperature reduction and decay heat removal values as a time integral function over a predetermined passive operating interval, comprising:
providing an impervious enclosure having a base and at least vertical sidewalls defining therewithin predetermined values of cross-sectional area, height and corresponding volume, and comprising a first lower stage extending from the base to a first height and a second stage extending from the first stage to a second height and a head space thereabove, the second stage being of greater height and volume than the first stage;

disposing a filter within the enclosure, the filter having impervious vertical sidewalls and perforated top and bottom, horizontal closure plates secured to the sidewalls and defining therewithin predetermined values of horizontal cross-sectional area, sidewall height and corresponding volume, the filter being substantially filled with a porous filter media to define a porous filter bed and positioned centrally within the enclosure and displaced by a predetermined vertical space from the base thereof with the top plate at the first height and defining the first stage and the cross-sectional area of the porous filter bed defining a central region of substantially equal cross-sectional area in the first stage, the central region extending upwardly into the second stage, and a boundary region surrounding and extending between the central region and the interior of the enclosure, the perforated top and bottom closure plates providing generally vertical flow paths through the porous filter bed;

filling the enclosure with a volume of water to an initial water surface level substantially at the second height;

distributing hot pressurized gases and particulate matter within the predetermined vertical space and beneath the porous filter bed in a generally vertically upward direction and substantially uniform flow distribution toward the porous filter bed;

permitting water to flow from the boundary region portion of the volume thereof in the first stage, laterally inwardly to within the predetermined vertical space between the porous filter bed and the base of the first enclosure for mixing with the gases and particulate matter therein distributed and producing a mixed two-phase flow in the generally vertical flow paths through the porous filter bed for first stage filtering thereby and upwardly through the volume of water in the central region of the second stage above the porous bed filter for second stage filtering by pool scrubbing and for removing decay thereby;

discharging gases separated and released from the mixed, two-phase flow at the surface of the volume of water; and selecting the height of the second stage for accommodating a corresponding height of water to perform sufficient second stage pool scrubbing of the mixed, two-phase flow in combination with the first stage filtering thereof by the porous filter bed to achieve the required decontamination factor values and selecting the volume of the second stage and the corresponding volume of water therein for functioning as a heat sink sufficient to achieve the required temperature reduction and decay heat removal values, as time integral functions over the required passive operating interval.

16. The method recited in claim 15, further comprising:
selecting the volume of the second stage and the corresponding volume of water therein to afford a remainder volume of water at the conclusion of the passive operating interval sufficient to substantially fill the first stage and cover the porous filter bed.

17. A method for filtering and removing decay heat from pressurized gases and entrained particulate matter vented from a nuclear containment of a nuclear installation in a postulated accident scenario, comprising:

providing an impervious enclosure having a base and at least vertical sidewalls defining therewithin predetermined values of cross-sectional area, height and corresponding volume, and comprising a first lower stage extending from the base to a first height and a second stage extending from the first stage to a second height and a head space thereabove, the second stage being of greater height and volume than the first stage;

disposing a filter within the enclosure, the filter having impervious vertical sidewalls and perforated top and bottom, horizontal closure plates secured to the sidewalls and defining therewithin predetermined values of horizontal cross-sectional area, sidewall height and corresponding volume, the filter being substantially filled with a porous filter media to define a porous filter bed and positioned centrally within the enclosure and displaced by a predetermined vertical space from the base thereof with the top plate at the first height and defining the first stage and the cross-sectional area of the porous filter bed defining a central region in the first stage of substantially equal cross-sectional area, the central region extending upwardly into the second stage, and a boundary region surrounding and extending between the central region and the interior of the enclosure, the perforated top and bottom closure plates providing generally vertical flow paths through the porous filter bed;

filling the enclosure with a volume of water to an initial water surface level substantially at the second height;

responding to the pressure level within the nuclear containment approaching a pressure set point defined in accordance with the design of the nuclear containment for automatically venting pressurized gases and entrained particulate matter from the nuclear containment thereby to maintain the gas pressure therein at a value no greater than the pressure set point and distributing the vented gases and particulate matter within the predetermined vertical space and beneath the porous bed filter in a generally vertically upward direction and substantially uniform flow distribution toward the porous filter bed;

permitting water to flow from the boundary region portion of the volume thereof in the first stage, laterally inwardly to within the predetermined vertical space between the porous filter bed and the base of the first enclosure for mixing with the gases and particulate matter therein distributed and producing a mixed two-phase flow in the generally vertical flow paths through the porous filter bed for first stage filtering thereby and upwardly through the volume of water in the central region of the second stage above the porous bed filter for second stage filtering by pool scrubbing and for removing decay heat thereby; and discharging gases separated and released from the mixed, two-phase flow at the surface of the volume of water.

18. A method as recited in claim 17, further comprising:

responding to a subsequent reduction of pressure within the nuclear containment from the level approaching the pressure set point to a prescribed, lower level, for terminating further venting of gas and particulate matter from the containment.

19. Apparatus for filtering absorbable gases and particulate matter and removing heat from a flow of hot gases and entrained particulate matter, comprising:

an impervious enclosure having a base and sidewalls and of predetermined height and cross-sectional area and corresponding volume;

a filter having a porous filter bed of predetermined height and horizontal cross-sectional area and corresponding volume, disposed centrally of the enclosure and displaced from the base thereof by a predetermined vertical spacing, the top of the porous filter bed being at a predetermined height within the enclosure and defining a corresponding first stage within the enclosure and a second stage extending to a second height and a head space thereabove, the height of the second stage being a multiple of the height of the porous filter bed; a central region substantially equal to the cross-sectional area of the porous filter bed, the central region extending through the filter bed and upwardly into the second stage, and a boundary region surrounding the central region and extending to the interior of the enclosure;

a volume of water received within the enclosure and filling same to an initial water surface level substantially at the second height;

means for receiving hot pressurized gases and entrained particulate matter and distributing same in a generally vertically upward direction and substantially uniform flow distribution toward the porous filter bed;

means for permitting water to flow from the boundary region portion of the volume thereof in the first stage, laterally inwardly to within the predetermined vertical space between the porous filter bed and the base of the enclosure for mixing with the gases and particulate matter distributed by the distributing means and producing a mixed two-phase flow in the generally vertical flow paths through the porous filter bed for first stage filtering thereby and upwardly through the volume of water in the central region of the second stage above the porous filter bed for second stage filtering by pool scrubbing and for removing decay heat thereby; and means disposed above the initial water surface level in the second stage of the enclosure for discharging gases separated and released from the mixed, two-phase flow at the surface of the volume of water.

20. Apparatus as recited in claim 19, wherein the ratio of the cross-sectional area of the enclosure to that of the porous filter bed is selected to be no less than a minimum value required for maintaining the boundary region.

21. Apparatus as recited in claim 19, wherein the ratio of the height of the second stage to that of the porous filter bed is a minimum of approximately five.

22. Apparatus as recited in claim 19, wherein the ratio of the cross-sectional area of the enclosure to that of the porous filter bed is selected to be no less than a minimum value for maintaining the boundary region and the ratio of the height of the second stage to that of the porous filter bed is a minimum of approximately five.

23. Apparatus as recited in claim 19, wherein the ratio of the volume of the second stage to that of the porous filter bed is a minimum of approximately 20, and the ratio of the height of the second stage to that of the porous filter bed is a minimum of approximately five.

* * * * *